UNITED STATES PATENT OFFICE.

HARRY LAWRENCE VON BONHORST, OF LOS ANGELES, CALIFORNIA, ASSIGNOR OF TWO-THIRDS TO JOHN EDWARD KELLY AND NICHOLAS A. DEN, OF LOS ANGELES, CALIFORNIA.

DECORATING GLASS, &c.

SPECIFICATION forming part of Letters Patent No. 690,889, dated January 7, 1902.

Application filed June 8, 1901. Serial No. 63,862. (No specimens.)

*To all whom it may concern:*

Be it known that I, HARRY LAWRENCE VON BONHORST, of the city of Los Angeles, in the county of Los Angeles and State of California, have invented certain new and useful Improvements in Decorating Glass and other Transparent Substances, so as to Imitate Ornamental Stone, to be used in buildings and in the equipment of buildings—such as wainscot-panels, door-panels, railway-carriage panels, ships' panels, and other like uses—of which the following is a full, clear, and exact description or specification.

My said invention, which relates to the decorating of glass so that the glass when so decorated has or may have the appearance of ornamental stone—such as onyx, agate, marble, granite, or other analogous ornamental stones—consists in treating the pieces of glass or other transparent material to be decorated for such uses and for analogous uses hereinbefore described as follows:

A flat receptacle of slaked lime or whiting is prepared by placing any required depth of such slaked lime or whiting into a flat box or vessel, the slaked lime or whiting being mixed with water to render the lime or whiting a semifluid body, and upon the upper level or smooth surface of this said semifluid body there is dropped oil-paint of the requisite colors, quantities, and consistency and in such positions upon the flat level surface of the semifluid body of lime or whiting and water that it shall in itself imitate the ornamental colors and relative positions of the ornamental colors in the stone sought to be imitated. In this manner the upper surface of the semifluid lime or whiting and water becomes interspersed in the required positions with drops of the paint of the requisite color and in the requisite positions to produce the imitative effect, which effect is ultimately reached by blending or commingling together to any required extent the drops of paint with any suitable manually-operated instrument, such as a spatula. When the colors have thus been dropped and mixed or blended and commingled in the semifluid powdered lime or whiting and water, then the sheet of glass, which has previously been wiped clean, is laid directly on the semifluid material, the effect of which laying on of the glass is to cause the mixed or commingled paint to adhere to the lower surface thereof, so as to admit of the sheet of glass being lifted out of the bath with the commingled or blended paint adhering thereto in the required position in imitation of the stone to be imitatively represented thereby. In this condition the commingled or blended paint is allowed to dry on the under surface of the glass, and then, but not until then, any powdered lime or whiting which may adhere to the glass is washed off from the glass, thereby leaving those portions of the surface of the glass which are not covered by paint clear and transparent. The sheet of glass with paint thus dried on it and with the lime or whiting washed off it is then in the condition for receiving the ground or basic color of the stone to be imitated, and in order to cover these intermediate surfaces or spaces of the transparent glass or other material with the color necessary to constitute the ground or basic color of the stone imitated the entire surface of the glass upon which the imitative coloring of the ornamental stone has been fixed by drying is then wholly painted over with oil-paint or any color requisite to produce the ground or basic coloring, which then causes the front unpainted surface of the glass to appear smooth and polished, in imitation of the ornamental stone intended to be imitated or represented.

In order to make it perfectly certain that the entire surface of the glass is completely covered with oil-paint, there may be one or more coatings of the ground or basic color painted upon the back of the sheet of glass, and to prevent the imitative surfaces from being disturbed by friction, abrasion, or scratches, or rubbing a coating of sand or other fine granulated material may be distributed over the ground or basic color and remain permanently attached thereto, being allowed to dry thereon.

It is to be understood that my invention may be applied to panels or wainscoting of every kind or description, so that my invention necessarily has a very large range of applicability in all cases where surfaces of buildings or of furniture or of doors or window-casings or other parts of buildings have to be decorated with ornamental stone, and my invention has the advantage over using actual stone that it is capable of producing very exact imitative effects of such stone at a very considerable reduction in the price of the said material used for decorative purposes. The other advantages which result from the use of these decorative panels are so obvious to any decorator or constructor of ornamental buildings that it is altogether unnecessary to refer to them in this specification.

What I claim as my invention consists as follows:

The ornamenting of plates or sheets of glass or other transparent material by means of paint dropped into a semifluid body of slaked lime, said paint being mixed or commingled in any desired proportions of coloring or imitative effect of color in ornamental stones, after which said paint or imitative coloring is caused to adhere to the surface of a plate or sheet of glass in the imitation desired, and whereon said commingled coloring is allowed to dry; and after being dried, the whole is washed with water, whereby any slaked lime is removed from the intermediate spaces of the colored imitation in the paint blended and adhering to the inner surface of the glass which intermediate surfaces are then covered by a ground or basic coloring caused to adhere thereto by drying thereon, the said inner surface being afterward finely coated with sand or equivalent material, for protecting it in the manner and for the purposes hereinbefore described.

In testimony whereof I, HARRY LAWRENCE VON BONHORST, have hereunto set my hand and seal, this 16th day of March, 1901, in the presence of two subscribing witnesses.

HARRY LAWRENCE VON BONHORST. [L. S]

Witnesses:
ST. JOHN DAY,
WILLIAM E. MURRAY.